United States Patent
Le Pabic

(10) Patent No.: US 7,599,477 B2
(45) Date of Patent: Oct. 6, 2009

(54) TELEPHONE SYSTEM USING ONE OR SEVERAL MICRO-COMPUTERS

(76) Inventor: Jean Pierre Le Pabic, 20, avenue des Accacias, 92 500 Rueil Malmaison (FR)

( * ) Notice: Subject to any disclaimer, the term of this patent is extended or adjusted under 35 U.S.C. 154(b) by 1375 days.

(21) Appl. No.: 10/416,357

(22) PCT Filed: Nov. 6, 2001

(86) PCT No.: PCT/FR01/03417

§ 371 (c)(1),
(2), (4) Date: Sep. 2, 2003

(87) PCT Pub. No.: WO02/39702

PCT Pub. Date: May 16, 2002

(65) Prior Publication Data

US 2004/0047455 A1 Mar. 11, 2004

(30) Foreign Application Priority Data

Nov. 9, 2000 (FR) .................................. 00 14574

(51) Int. Cl.
*H04M 11/00* (2006.01)

(52) U.S. Cl. .................. 379/93.01; 379/93.09
(58) Field of Classification Search .............. 379/93.05, 379/90.01, 93.09, 93.08; 370/352
See application file for complete search history.

(56) References Cited

U.S. PATENT DOCUMENTS

2002/0101965 A1 * 8/2002 Elzur ...................... 379/93.01

* cited by examiner

*Primary Examiner*—Stella L Woo
(74) *Attorney, Agent, or Firm*—Boyle Fredrickson, S.C.

(57) ABSTRACT

The telephone system of the invention combines at least one telephone terminal (40 to 43) and one microcomputer (38 to 40) using a set of software modules, especially a module for functions normally carried out by top range telephone stations: free hand functions, recorder telephone answering sets, fax/modems, storage of numbers, automatic dialling, display on the screen of a microcomputer, and/or a module for services normally centralised for a large number of users, and/or a module concerning new functionalities: Internet/Intranet access, vocal recognition, automatic reading, small capacity unit automatic exchanges.

8 Claims, 5 Drawing Sheets

TELEPHONE SYSTEM USING ONE OR SEVERAL MICRO-COMPUTERS

FIELD OF THE INVENTION

BACKGROUND OF THE INVENTION

The present invention concerns a telephone system combining at least one telephone terminal, a microcomputer and a set of software modules installed in the microcomputer.

Generally speaking, a system of this type has already been proposed introducing a top range telephone terminal equipped with microprocessors and having a large number of functionalities adapted to the telephone function, including the fax function and the transmission of data function (modem). This terminal is connected to an office microcomputer which for the most part only carries out the role of an input/output terminal and includes software and the fax/modem circuits normally linked to a modem box. Thus, the price of the telephone terminal is naturally relatively high.

There is also a telephone system constructed around an Ethernet network to which a specific server is connected, as well as possible platforms to the switched telephone network or long-distance IP networks (Internet, Intranet) and also telephone stations. These telephone stations are directly connected to the Ethernet cable. The unit then functions as a unit automatic exchange (PABX).

It has been proved that this concept eliminates from the market all those entities or persons having microcomputers not connected onto the local network which covers almost all individuals and extremely small concerns, that is most of potential buyers.

In addition, the Ethernet connection significantly increases the cost of the telephone station as long as a specific server is used for execution of the telephone programmes.

Thus, the aim of the invention is to eliminate these drawbacks.

It starts by sating that the arrival of the high-speed bus, for example the USB standard equipment bus, procures an economic means of communication whose performances are compatible with the calculation power of the processor.

Thus, it offers a telephonic system characterised in that it utilizes, on the one hand, an "USB" telephone terminal reduced to its minimal functions of telephone interfaces to emit and receive phone calls even in the event of interruptions of current, this telephone terminal being connected to a micro computer by the intermediary of a bus, for example of type USB and, in addition, a set of software modules installed in the microcomputer, comprising at least:

a software module concerning of functions up to now specifically installed in top-of-the-range telephones, in particular a telephone function free hands using a microphone and loudspeakers connected to the microcomputer, an automatic message recorder function, a modem-fax function, a memory function of numbers and automatic dialling, a function of displaying on the screen of the microcomputer and/or a broad band telephony function for example 7 Khz if the totality of the communication is carried out by numerical way and/or a software module concerning of the services usually centralised in expensive systems planned for a great number of users in particular written messaging function and/or vocal messaging function and/or fax function and/or taxation function, and/or a software module concerning of the new functionalities or usually making the object of specific systems, in particular telephony on Internet/Intranet networks, the release of macro-instruction on the recognition of caller, the voice recognition, the automatic reading, the telephone data management (in particular directory) and/or the automatic switchboard of small capacity function (for example 2 lines, 6 stations) if several telephone terminals are connected on same USB bus.

Similarly, the link between the controller and the microcomputer could include at least three channels, namely one channel for transferring data between the microcomputer and a telephone terminal and at least two audio channels respectively allocated to the link between the microcomputer and a telephone line and to the link between the microcomputer and a telephone receiver.

SUMMARY OF THE INVENTION

According to the invention, one important advantage of the solution consists of the fact that the software modules could include a "unit automatic exchange" (PABX) function. This function is particularly advantageous for a network assembly of a plurality of microcomputers.

In fact, it makes it possible to avoid having two separate networks, namely one for the telephone (this network being controlled by a unit automatic exchange) and the other for the computer system (possibly including a server): only the computer network suffices.

This results in obtaining significant savings as regards the equipment and the laying of the network.

In addition, the system of the invention could use a router to provide telephone communications via the IP network (Internet or Intranet).

BRIEF DESCRIPTION OF THE DRAWINGS

There follow description of several embodiments of the invention, given by way of non-restrictive examples, with reference to the accompanying drawings on which.

DETAILED DESCRIPTION

Figure 1:
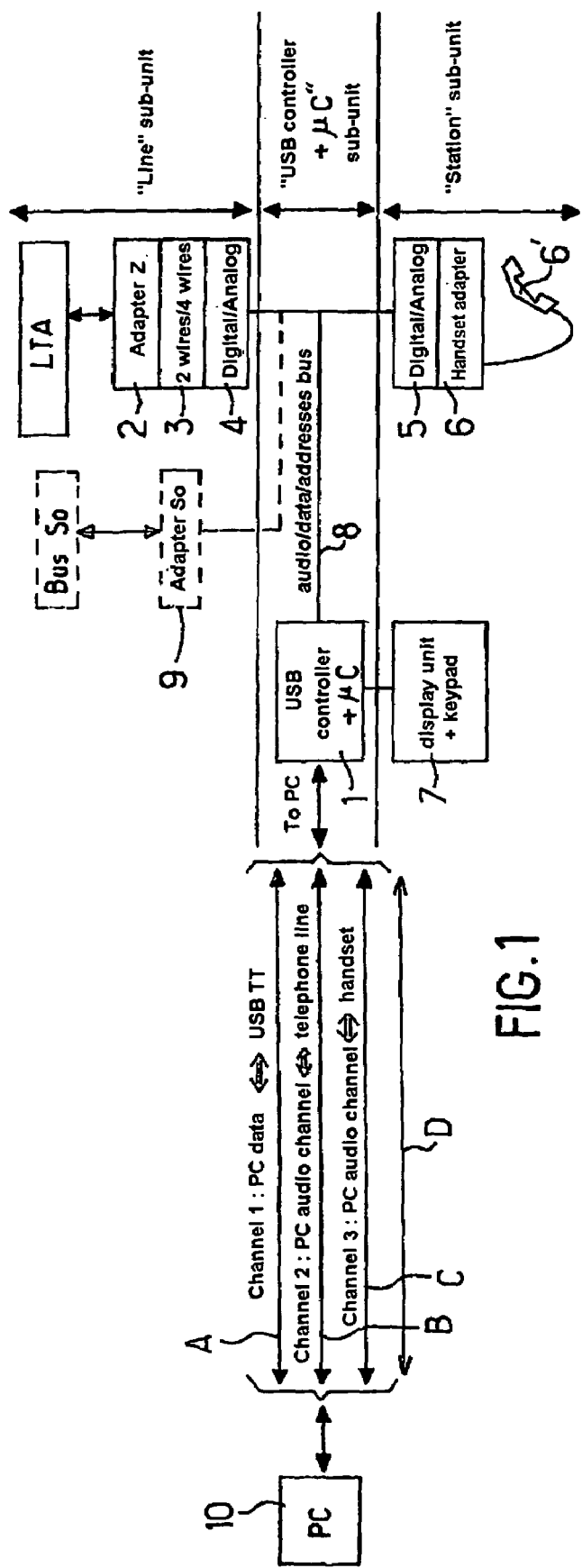
FIG. 1 is a skeleton diagram of a telephone terminal according to the invention and able to be connected to an analog line (full lines) or to a digital line (broken lines)

In the example shown on FIG. 1, the terminal of the invention includes three sub-units, namely:

a "USB bus controller" sub-unit associated with a microcontroller 1, a "line" sub-unit including interface circuits 2, 3 with the analog telephone line LTA (impedance adapter and 2/4 wire converter) and a digital/analog converter 4, a "station" sub-unit including the combined interface circuits (digital/analog converter 5 and adapter 6) and dialling keypad associated with a display unit 7.

The "line" and "station" sub-units are connected to an addresses/data/audio bus of the USB bus controller 1 by means of their respective digital/analog converters 4, 5. Nevertheless, they are functionally independent and could be separated physically. It is preferably solely for reasons of economy and convenience that they be installed in a given block.

In this example, the "line" sub-unit further includes an adapter So 9 providing a digital link between the bus 8 and a services integration digital telecommunications network (RNIS), for example, on the bus So (4 wires) of this network. Of course, this digital link (shown by the broken lines) can be provided as a complement to or replacement for the analog line 2, 3, 4, LTA.

In the absence of any connection to a microcomputer, the telephone terminal (1 to 9) is fed by a telephone line LTA and is able to send and receive calls, like any conventional basic telephone station.

In this example, the link between the controller 1 and the microcomputer PC 10 includes four channels, namely: one channel A for the transfer of data between the microcomputer 10 and the telephone terminal 1 to 9; three audio channels B, C, D with B and C being allocated to the microcomputer/telephone link, and a channel D allocated to the receiver link/microcomputer/telephone receiver 6'.

Figure 2:
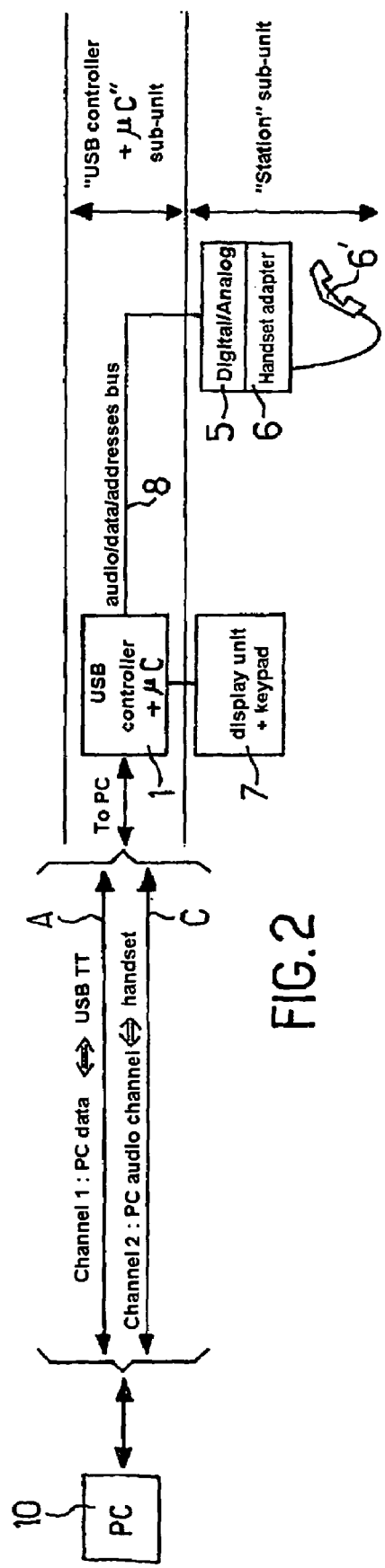
FIG. 2 is a skeleton diagram of a simplified terminal.

The telephone terminal shown on FIG. 2 is a simplified version of the terminal of FIG. 1 in which the "line" sub-unit is not installed. This terminal is suitable in a case where it is connected to a bus or a network to which several terminals are connected, at least one of said terminals being of the type shown on FIG. 1 and including a "line" sub-unit. In fact, in this case, it is not necessary to have the same number of lines as telephone stations. The link between the controller 1 and the microcomputer 10 no longer includes more than two channels, namely the channels A and C.

Of course, the microcomputer 10 ought to include functional programmes able to ensure the management of the telephone terminals, especially as regards the internal communications (between the terminals themselves via the microcomputer 10) and external communications (between the terminals 1 to 9 and the telephone line(s) LTA, So). Thus, these functional programmes could include the following modules shown diagrammatically on FIG. 3:

USB exchange module 21 between the microcomputer 10 and the telephone terminal 1 to 9;

Audio receiving and transmission modules 18, 19 at 64 kb/s or at 128 kb/s;

Switching module 20 at 64 kb/s or 128 kb/s;

Interface module 17 with the microphone and loud-speakers of the microcomputer. This module includes sound compression and sampling programmes 22 with a 7 kHz band width able to be used for end-to-end digital communications;

Voice compression and decompression modules 23', 29;

IP Encapsulation and de-encapsulation modules (Internet, Intranet) 27, 30;

IP switching module (Internet, Intranet) 28;

Data modulation and demodulation modules 25, 22;

Audio file management module 26;

Data file management module 23;

Module 24 for converting data files into fax format;

RHM man/machine relation and management modules for the various functions 12 to 16;

General manager programme 11.

Figure 3:
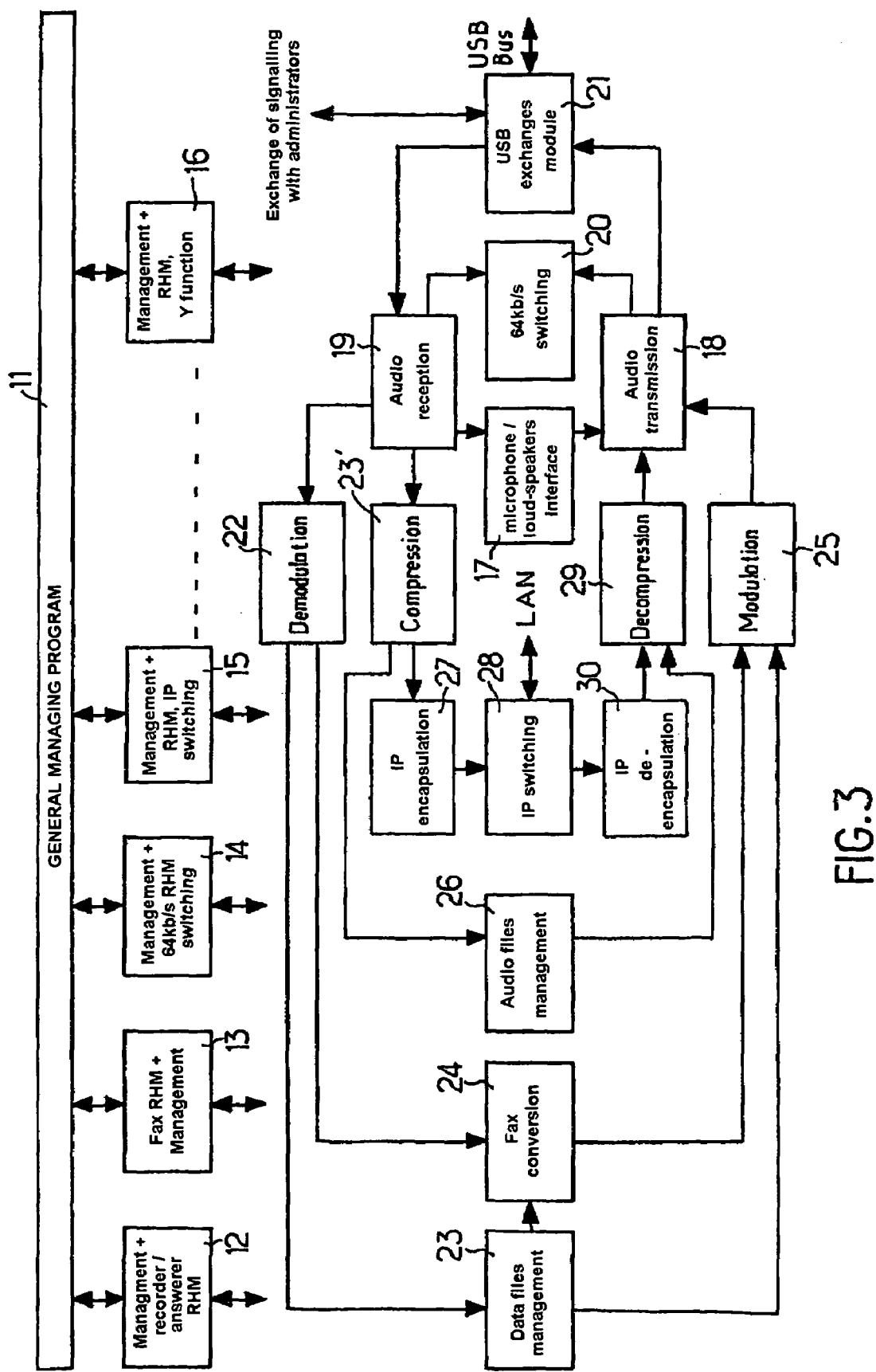
FIG. 3 is a synoptic diagram of the main software modules able to equip the microcomputer to which the terminals of the invention are connected.

More specifically, on FIG. 3 the block 11 represents the general manager programme to which the various modules can be connected, namely: a recorder/answerer management module 12, a fax management module 13, a module 14 for managing switchings for transmissions at 64 kb/s, a module 15 for managing communications for communications on IP networks (Intranet/Internet) and an RHM and management module 16 for the other functions.

In this example, the microphone/loud-speaker interface 17 is connected to transmission 18 and receiving 19 modules which control a 64 kb/s switching module 20.

The audio receiving unit 19 receives information from the USB exchange module 21 which directly manages the exchanges with the USB bus of the microcomputer 10.

The audio receiving unit 19 sends its information to a demodulation module 22 and to a compression module 23'.

The demodulation module 22 transmits the demodulated information to a file management module 23 and/or to a fax conversion module 24, these two modules being connected to the audio transmission unit 18 by means of a modulation module 25.

The compression module firstly transmits the compressed information to an audio file management module 26 and secondly to a unit successively including an IP encapsulation module 27 and an IP switching module 28 connected bidirectionally to the LAN local network.

The IP switching module 28 in addition transmits information to a decompression module 29 (which also receives information from the audio file module 26) via an IP de-encapsulation module 30.

The audio transmission module 18 receives the decompressed information originating from the decompression module 29 as well as information originating from the modulation module 25.

Of course, in the case of independent users, the installation could be limited to a single USB telephone terminal connected on a microcomputer, also able to be used for communications: data a fax, receiving and sending. The user could benefit as desired from all or part of the previously described functional modules.

Figure 4:
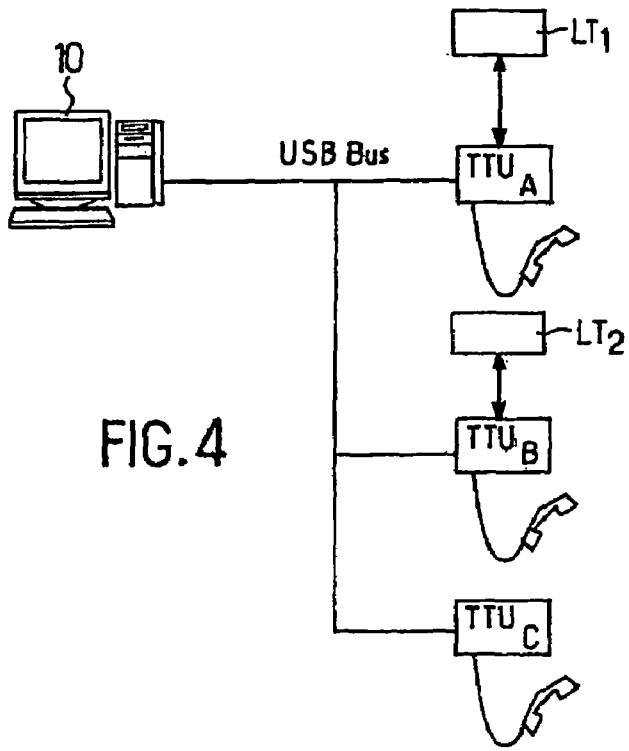
FIG. 4 is a diagrammatic representation of a configuration introducing a microcomputer and several terminals according to the invention.

In the case of extremely small concerns, the representative equipment could be constituted by a microcomputer 10, mainly used by the secretary, with one or two digital or analog telephone lines (here $LT_1$, $LT_2$) and several telephone terminals (FIG. 4).

All the terminals TTUA, TTUB, TTUC, two of which only, TTUA, TTUB, are equipped with a telephone line ($LT_1$, $LT_2$), are connected on the USB bus of the microcomputer 10.

The microcomputer 10 then plays the role of a small-capacity unit automatic exchange, said capacity in this example being fixed at two lines and three terminals, two of the terminals TTUA and TTUB being equipped with a telephone line ($LT_1$, $LT_2$).

The basic functioning of this small-capacity unit automatic exchange shall be explained hereafter:

1) One of the terminals (for example the terminal TTUA) wishes to establish a sending communication. On dialling the external call prefix, it asks the microcomputer 10 for a line, said microcomputer answering negatively if the two lines $LT_1$, $LT_2$ are occupied. If this is not the case, the microcomputer 10 establishes the audio connection between a free line and the corresponding terminal via its switching module. It then orders unhooking up of the selected line. The terminal TTUA can then dial.

2) An external call arrives picked up by one of the terminals, for example the terminal TTUA, is for another terminal, for example the terminal TTUB. Here, a case is considered in which the bell sets of the set of free terminals are activated upon detection of ringing on a line. The first terminal which unhooks takes the call. After being advised of the communication, the user of the terminal TTUA dials the number of the terminal TTUB. On unhooking of the latter and after hanging up of the terminal TTUA, the connection is established by the microcomputer 10.

3) The TTUC terminal (with no line) wishes to establish an initial communication:

This case is similar to case n° 1.

4) The TTUC terminal wishes to establish a local communication with the TTUB terminal. The user of the TTUC terminal dials the number of the TTUB terminal. On unhooking of the latter, the connection is established by the microcomputer 10.

With three terminals, the microcomputer is this able at the most to have to switch three telephone communications (two external communications and one local communication).

Figure 5:
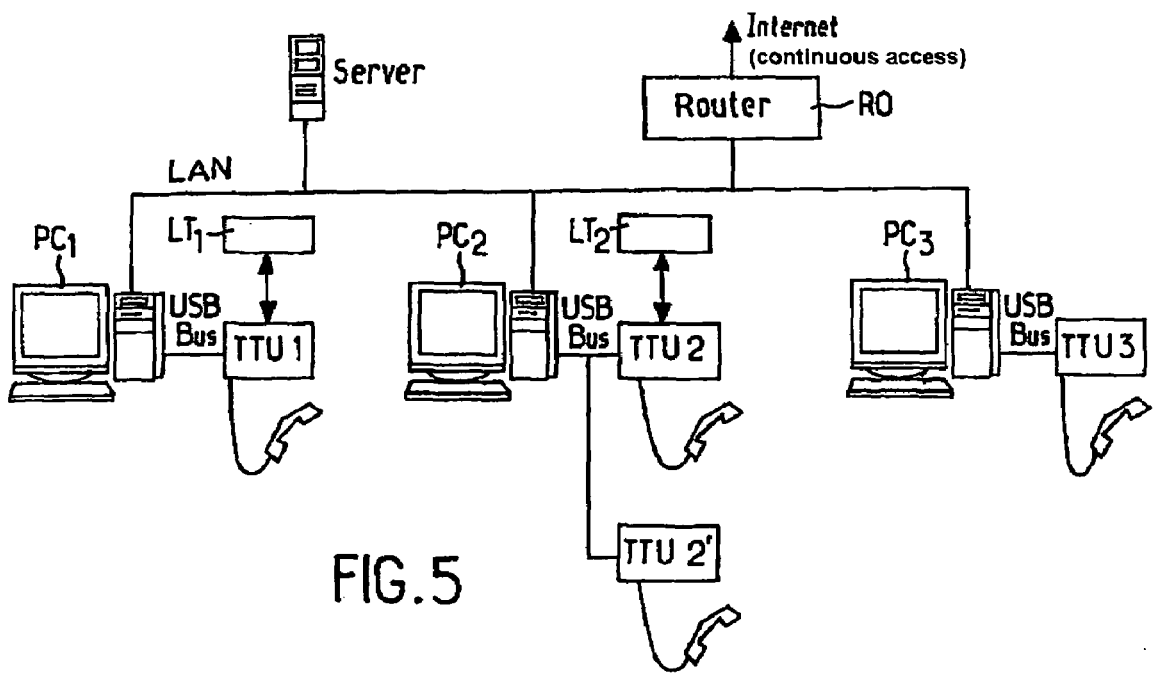
FIG. 5 is a diagrammatic representation of a configuration introducing several network-assembled microcomputers.

It is frequently the case that in small companies, a LAN local network connects the various microcomputers $PC_1$ to $PC_3$ of the concern and, in certain cases, a router RO offers specific access to the Internet (FIG. 5). Each working station (microcomputers $PC_1$ to $PC_3$) can be equipped with one or several telephone terminals TTU1 to TTU3, each possibly being provided with access to the switched telephone network RTC (analog or digital telephone lines $LT_1$, $LT_2$).

The communications between different working stations is then effected through the LAN local network exactly as they were effected through the USB bus in the case of extremely small concerns. However, switching is carried out under the IP protocol (Internet/Intranet).

Large concerns often have several local networks, each being allocated to one service. Thus, each defined entity can be equipped in the same way as a small concern of the type previously mentioned, the telephone lines RTC being able to be connected to the equipment of stations of the unit automatic exchange of the concern. As most of the telephone communications are basically internal to the service, the USB terminals equipment is able to effect significant savings concerning the size of the switch of the concern. It is also possible to provide certain stations with a direct telephone line RTC, the unit automatic exchange then no longer being used for inter-service communications.

With the size of the concern, the possibilities of vocal messaging become important. In fact, this service is currently for the most part installed and a significant source of costs including the equipment of USB telephones allows savings to be made.

Figure 6:
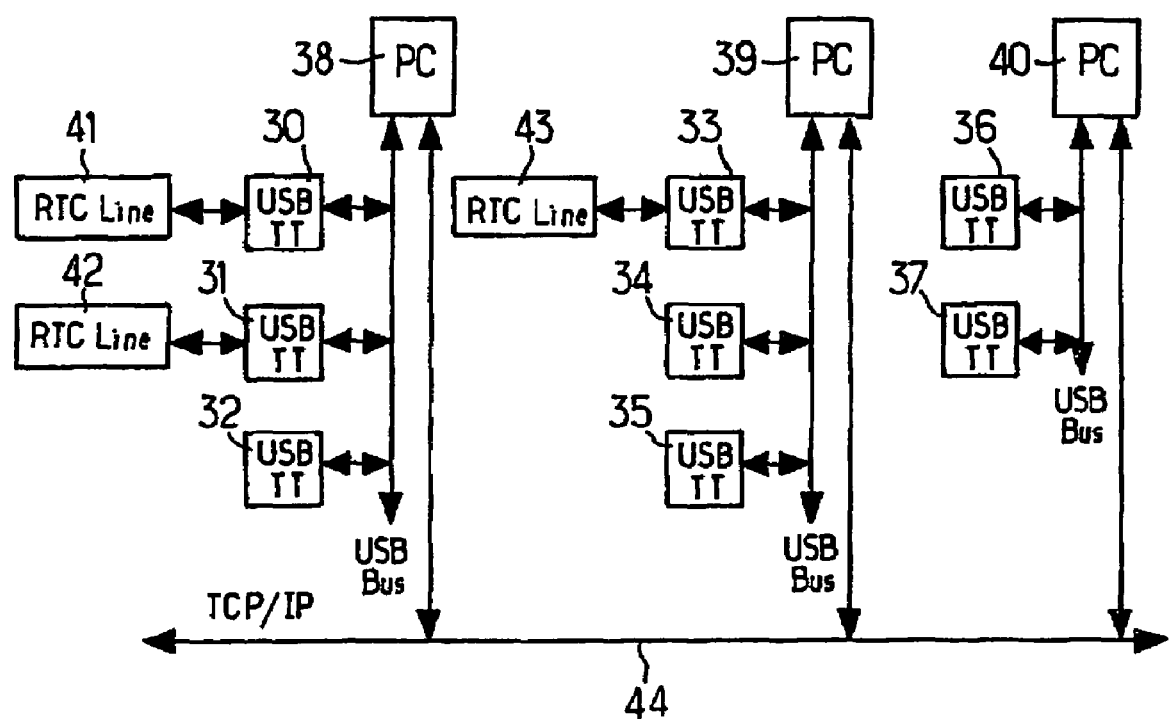
FIG. 6 is a diagram illustrating a physical configuration of a distributed unit automatic exchange able to be used in the network of FIG. 5.

As previously mentioned, the invention permits the embodiment of a unit automatic exchange distributed over a microcomputer-based local network having USB telephone terminals, such as the one illustrated on FIG. 6.

In this example, this unit automatic exchange introduces eight USB telephone terminals 30 to 37, only three of the latter having a telephone line 40 to 43.

The PC type microcomputers 30 to 40 amount to three and are interconnected by an Ethernet link under TCP/IP 44. Each microcomputer $PC_1$ 30 to 40 has one USB port and an Ethernet card. Three RTC telephone lines 41, 42, 43 are respectively connected to the terminals 30, 31, 33. Each USB telephone terminal 30 to 37 is connected to a microcomputer 38, 39, 40 by means of a USB link and possibly to an RTC telephone line.

Figure 8:
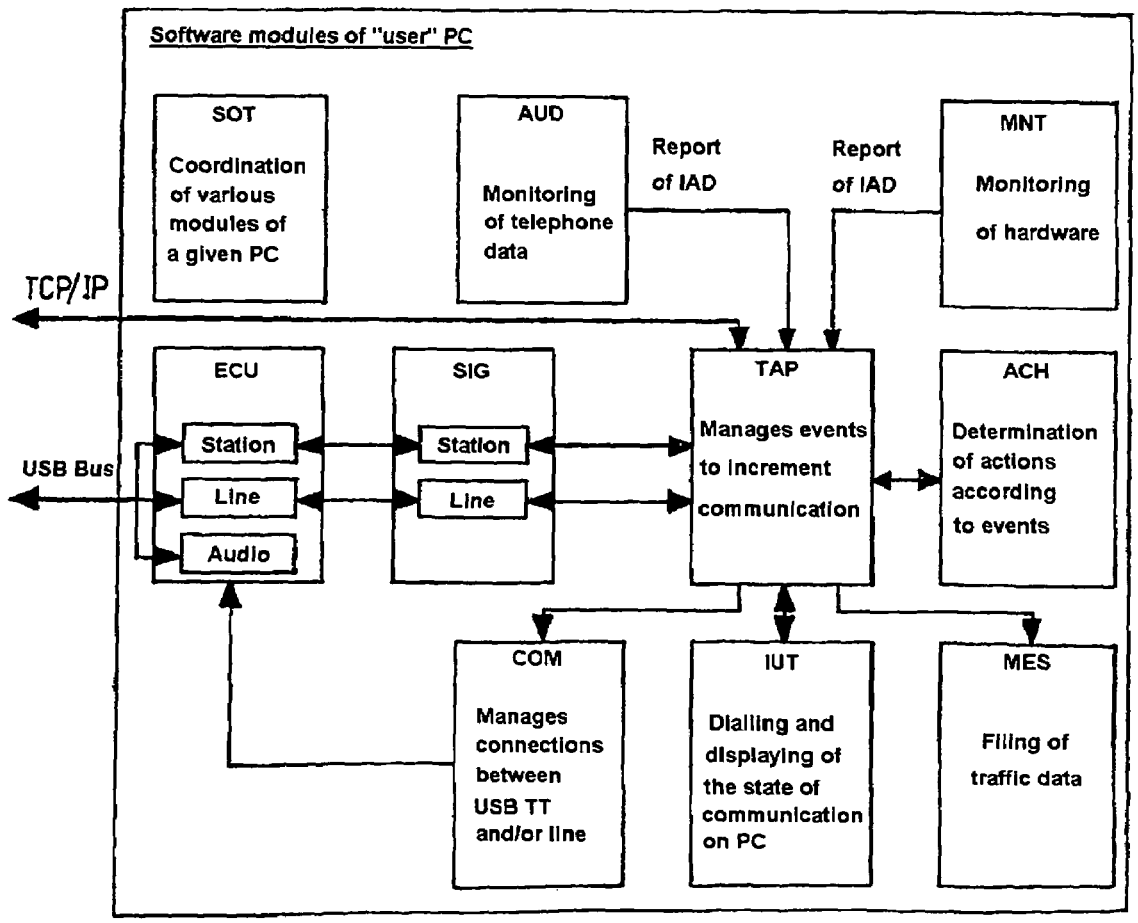
FIG. 8 is a synoptic diagram of the software modules of microcomputers intended for users in the assembly of the network shown on FIG. 5.

The software of the system for evaluating the distributed unit automatic exchange is broken down into modules and sub-modules. In the example shown on FIG. 8, it is broken down into eleven modules:

1) "USB Exchanges" Module (ECU)

This module is used to identify and format the messages circulating on the USB bus. It analyses the header of each message so as to route the data. It also carries out a translation of the physical address of the USB telephone terminal into its logic address. It includes three sub-modules:

the "station" sub-module which transmits and receives the information coming from the "station" sub-module of the "signalling" module, the "line" sub-module which transmits and receives the information coming from the "line" sub-module of the "signalling" module, the "audio" sub-module which manages the transmission and receiving of word samples between the USB telephone terminal and the PC.

2) "Signalling" Module (SIG)

This module manages the telephone signalling of the USB telephone terminal. It includes two sub-modules:

the "station" sub-module which analyses and processes the events coming from the "station" sub-module of the "USB exchange" module so as to transmit them to the "call processing" module. The "call processing" module sends back to it the actions to be carried out according to the state of the communication, the "line" sub-module which analyses and processes the events coming from the "line" sub-module of the "USB exchange" module so as to transmit them to the "call processing" module. The "call processing" module sends back to it the actions to be carried out according to the state of the line.

3) "Call Processing" Module (TAP)

This module is a coordinator module and its role is to manoeuvre the condition of the communications. It knows the state of the USB telephone terminals it manages.

This module communicates with the various "call processing" modules of the other PCs of the network so as to know the state of the various USB telephone terminals. Thus, it is able to select a free RTC line during an outgoing call.

It also informs the various "call processing" modules of the state of the USB telephone terminals it manages.

This "call processing" module interrogates the "routing" module so as to know the actions to be taken according to the event and the state of the communication. Thus, it generates a list of actions.

The "call processing" module sends alarm messages (coming from the "maintenance" and "audio" modules) to the "administrator" PC by means of the TCP/IP link.

4) "Routing" Module (ACH)

This module is a data module. It contains information on the telephone terminals of the system (for example the telephone terminal with call restriction or telephone terminal with call on unhooking). It also contains the actions to be taken according to the telephone terminal in question, events and the state of the line. It includes the dialling plan.

5) "Switching" Module (COM)

This module carries out and cuts the audio communications inside the PC microcomputer according to the directives of the call processing.

6) "Telephone Operational" Module (SOT) (Not Shown)

This module coordinates the telephone modules inside a given PC. It manages delay times and launches each software module with the required recurrence.

7) "Maintenance" Module (MNT)

This module regularly interrogates the various modules having physical interfaces. These interfaces carry out the controls asked for and sends a report. Should a problem occur, it sends an alarm message to the administration module.

8) "Audit" Module (AUD)

This module checks the coherence of the telephone data. Should a problem occur, it sends an alarm message to the administration module.

9) "Measuring" Module (MES)

This module files all the traffic data concerning the telephone terminals connected to the USB bus of the PC. When requested by the administration module, it processes this data.

10) "User Interface" Module (IUH)

This module makes it possible to roughly display the state of the communications.

11) "Administrator Interface" Module (IAD)

This module, solely present in the administration machine, is able to configure the distributed unit automatic exchange.

Figure 7:
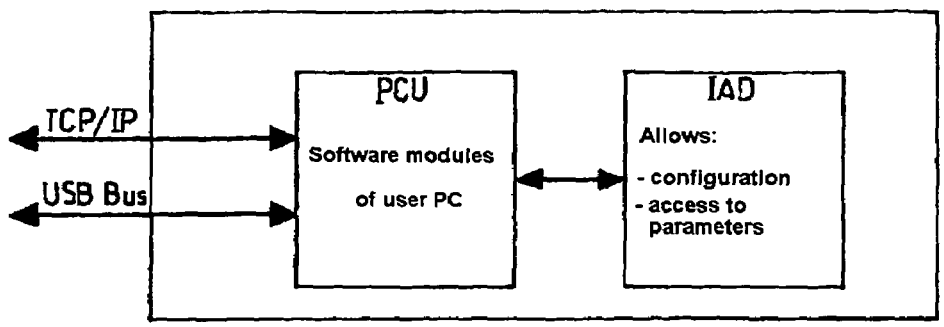
FIG. 7 is a diagrammatic representation illustrating the software segment of a microcomputer used for administrating a network.

Each "user" PC of the network is equipped with all the modules, except for the "administrator interface" module. This module, which is shown on FIG. 7, is solely present on the "administrator" PC of the network as a complement to the other software modules of user PCs (PCU block) which communicates with one another via the USB bus and TCP/IP Internet/Intranet links.

The distributed unit automatic exchange is able to:

Route an incoming call onto the first USB telephone terminal from a previously defined list of telephone terminals. This list contains all the telephone terminals of the network. If the first telephone terminal is occupied, the incoming call is then directed towards the second telephone terminal of the list, and so on until the last terminal of the list.

Pass a communication toward the outside world, a free RTC line then being selected, Establish a local communication between two USB telephone terminals on the same USB bus or by the use of the Ethernet link under TCP/IP, Carry out a transfer of a communication of a USB telephone terminal to another USB telephone terminal.

These various functionalities are processed by a software in the computer and can be made simultaneously and independently.

At the current moment, the flowrate of a USB bus reaches 12 Mo/s, which is for the most part greater than the maximum flowrate of a telephone conversation (at least 128 kbits/s).

In addition to useful information, the information on the USB bus contains:

a synchronisation frame,
a message header,
an error control.

Voice compression inside the PC makes it possible to obtain a band width of at least 128 kbits/s.

The invention claimed is:

1. A telephone system including a plurality of telephone terminals including at least one being connected to a telephone line, a microcomputer or several interconnected microcomputers, each microcomputer equipped with a set of software modules and a high-flow bus to which one or more of said telephone terminals are connected, each one of said telephone terminals including:

a USB bus controller sub-unit associated with one microcontroller, a station sub-unit including a handset and its interface circuits comprising a digital/analog converter, an adapter and a dialing keypad associated with a display unit, said telephone terminal connected to the telephone line further comprising an interface circuit with the telephone line, the station sub-unit and a line sub-unit of the terminal being connected to an audio/data/address bus of the bus controller sub-unit, and in that a link between the USB bus controller sub-unit of of said telephone terminal and the microcomputer includes at least three channels, namely one channel for transferring data between the microcomputer and said telephone terminal, a second channel that is a bidirectional audio channel link between the microcomputer and the handset, and a third channel that is an audio channel between the microcomputer and the telephone line, said at least three channels making it possible to establish telephone communications between said line and said telephone terminal and/or between said telephone terminals, and a plurality of microcomputers associated with telephone terminals of the type of said microcomputers being connected to a local network and each comprising an Ethernet card, characterised in that said microcomputers are programmed so as to constitute a distributed unit automatic exchange, the software of this unit automatic exchange being present in all the microcomputers and including at least the following modules:

a "USB exchanges" module for identifying and formatting the messages circulating on the USB bus, analyzing the header of each message so as to select the data, a "signaling" module which manages the telephone signaling of the USB telephone terminal, a "call processing" module which communicates with the various call processing modules of the other microcomputers of the network so as to know the state of the various USB telephone terminals and be able to select a free RTC line at the time of an outgoing call, a "routing" module containing information concerning the telephone terminals of the system concerning the actions to be taken according to the telephone terminal in question, events, the state of the line and concerning dialing, a "switching" module which carries out and cuts the audio connections inside the microcomputer, and a "telephone operational system" module which coordinates the telephone modules inside a given microcomputer, manages the delay times and launches each software module with the required recurrence.

2. The system according to claim 1, wherein the terminal connected to the telephone line is designed so as to transmit and receive telephone calls, even in cases where the current is cut off.

3. The system according to claim 2, wherein the "line" sub-unit includes a digital/analog converter in the case of an analog telephone line and/or an adapter for providing a digital link between the bus and digital telecommunications network with integrated services.

4. The system according to claim 1, wherein said microcomputer is programmed so as to play the role of a small-capacity unit automatic exchange whose capacity is equal to the number of telephone terminals and carry out the following operational sequences:

in the case where a first terminal wishes to establish an initial communication by dialing the external call prefix, said terminal asks the microcomputer for a line, said microcomputer responding negatively if the two lines are occupied; if this is not the case, it establishes an audio connection between a free line, for example and the terminal via its switching module; it then orders unhooking of the selected line so that said first terminal can dial;

in the case where an external call is picked up by the first terminal and intended for another terminal, after formatting the communication, the user of the terminal who has picked up the receiver dials the number of the intended recipient and after said recipient has picked up the receiver and after hanging up of the first terminal, the connection is established by the microcomputer.

5. The system according to claim 4, wherein said microcomputer is programmed so as to ensure local communications between said terminals.

6. A telephone system including a plurality of telephone terminals including at least one being connected to a telephone line, a microcomputer or several interconnected microcomputers, each microcomputer equipped with a set of software modules and a high-flow bus to which one or more of said terminals are connected, each one of said telephone terminals including:

a USB bus controller sub-unit associated with one microcontroller, a station sub-unit including a handset and its interface circuits comprising a digital/analog converter, an adapter and a dialing keypad associated with a display unit, said telephone terminal connected to the telephone line further comprising an interface circuit with the telephone line, the station sub-unit and a line sub-unit of the terminal being connected to an audio/data/address bus of the bus controller sub-unit, wherein a link between the USB bus controller sub-unit of said telephone terminal and the microcomputer includes a first channel for transferring data between the microcomputer and said telephone terminal and a second channel that is a bidirectional audio channel link between the microcomputer and the handset, said channels making it possible to establish telephone communications between said line and said telephone terminal and/or between said telephone terminals, a plurality of microcomputers associated with telephone terminals of the type of said microcomputers being connected to a local network and each comprising an Ethernet card, characterised in that said microcomputers are programmed so as to constitute a distributed unit automatic exchange, the software of this unit automatic exchange being present in all the microcomputers and including at least the following modules:

a "USB exchanges" module for identifying and formatting the messages circulating on the USB bus, analyzing the header of each message so as to select the data, a "signaling" module which manages the telephone signaling of the USB telephone terminal, a "call processing" module which communicates with the various call processing modules of the other microcomputers of the network so as to know the state of the various USB telephone terminals and be able to select a free RTC line at the time of an outgoing call, a "routing" module containing information concerning the telephone terminals of the system concerning the actions to be taken according to the telephone terminal in question, events, the state of the line and concerning dialing, a "switching" module which carries out and cuts the audio connections inside the microcomputer, a "telephone operational system" module which coordinates the telephone modules inside a given microcomputer, manages the delay times and launches each software module with the required recurrence, wherein the software of said distributed unit automatic exchange present in all the microcomputers further includes:

a "maintenance" module which regularly interrogates the various modules having physical interfaces which carry out the controls asked for and send a report and possibly should a problem occur an alarm message intended for an administration module, and/or an "audit" module which checks the coherence of the telephone data and, should a problem occur, sends an alarm message to the administration module, and/or a "measuring" module which files all the data of the traffic concerning the telephone terminals connected to the bus of the microcomputer, this module when requested processing this data, and/or a "user interface" module able to display a rough guide of the state of the communications.

7. The system according to claim 6 introducing several microcomputers assembled in a network including an administration machine, characterised in that this administration machine includes an "administrator interface" software module complementing the other software modules of the microcomputers of the network and communicating with one another via said bus and Internet/Intranet links.

8. A telephone system including a plurality of telephone terminals including at least one being connected to a telephone line, a microcomputer or several interconnected microcomputers, each microcomputer equipped with a set of software modules and a high-flow bus to which one or more of said terminals are connected, each one of said telephone terminals including:

a USB bus controller sub-unit associated with one microcontroller, a station sub-unit including a handset and its interface circuits comprising a digital/analog converter, an adapter and a dialing keypad associated with a display unit, said telephone terminal connected to the telephone line further comprising an interface circuit with the telephone line, the station sub-unit and a line sub-unit of the terminal being connected to an audio/data/address bus of the bus controller sub-unit, wherein a link between the bus controller sub-unit of said telephone terminal and the microcomputer includes a first channel for transferring data between the microcomputer and said telephone terminal and a second channel that is a bidirectional audio channel link between the microcomputer and the handset, said channels making it possible to establish telephone communications between said line and said telephone terminal and/or between said telephone terminals, a plurality of microcomputers associated with telephone terminals of the type of said microcomputers being connected to a local network and each comprising an Ethernet card, characterised in that said microcomputers are programmed so as to constitute a distributed unit automatic exchange, the software of this unit automatic exchange being present in all the microcomputers and including at least the following modules:

a "USB exchanges" module for identifying and formatting the messages circulating on the USB bus, analyzing the header of each message so as to select the data, a "signaling" module which manages the telephone signaling of the USB telephone terminal, a "call processing" module which communicates with the various call processing modules of the other microcomputers of the network so as to know the state of the various USB telephone terminals and be able to select a free RTC line at the time of an outgoing call,

- a "routing" module containing information concerning the telephone terminals of the system concerning the actions to be taken according to the telephone terminal in question, events, the state of the line and concerning dialing,
- a "switching" module which carries out and cuts the audio connections inside the microcomputer,
- a "telephone operational system" module which coordinates the telephone modules inside a given microcomputer, manages the delay times and launches each software module with the required recurrence, wherein the programming of said microcomputers is designed so as to:

- route an incoming call onto a first USB telephone terminal of a list of telephone terminals containing all the telephone terminals of the network, and if this first terminal is occupied, of directing the incoming call towards a second telephone terminal on the list, and so on up to the last terminal of the list,
- Select a free telephone line so as to pass a telephone communication to the outside world,
- Establish a local communication between two USB telephone terminals on the same USB bus or via the use of an Ethernet link under TCP/IP,
- Transfer a USB telephone communication to another USB telephone terminal.

\* \* \* \* \*